(12) United States Patent
Lo

(10) Patent No.: US 7,009,837 B2
(45) Date of Patent: Mar. 7, 2006

(54) INTEGRATED LOCKING DEVICE

(75) Inventor: Chao-Yuan Lo, Tu Chen (TW)

(73) Assignee: Quanta Computer, Inc., Tao Yuan Shien (TW)

(*) Notice: Subject to any disclaimer, the term of this patent is extended or adjusted under 35 U.S.C. 154(b) by 34 days.

(21) Appl. No.: 10/874,334

(22) Filed: Jun. 24, 2004

(65) Prior Publication Data
US 2005/0041384 A1    Feb. 24, 2005

(30) Foreign Application Priority Data
Aug. 20, 2003   (TW) .............................. 92122926 A

(51) Int. Cl.
*G06F 1/16*  (2006.01)
(52) U.S. Cl. ............................ 361/683; 70/57; 248/552
(58) Field of Classification Search ................. 361/683
See application file for complete search history.

(56) References Cited

U.S. PATENT DOCUMENTS

| | | | | |
|---|---|---|---|---|
| 6,115,244 A | * | 9/2000 | Chen et al. ................. | 361/686 |
| 6,256,194 B1 | * | 7/2001 | Choi et al. ................... | 361/383 |
| 6,297,951 B1 | * | 10/2001 | Lee ............................. | 361/683 |
| 6,469,900 B1 | * | 10/2002 | Cheng ......................... | 361/726 |
| 6,654,239 B1 | * | 11/2003 | Smith .......................... | 361/683 |
| 6,678,154 B1 | * | 1/2004 | DeLuga ....................... | 361/683 |
| 6,785,141 B1 | * | 8/2004 | Fang ........................... | 361/727 |

\* cited by examiner

Primary Examiner—Lisa Lea-Edmonds
(74) Attorney, Agent, or Firm—Rabin & Berdo, PC

(57) ABSTRACT

An integrated locking device is described. The integrated locking device is utilized to lock and remove a removable device and is especially suitable in a notebook computer. The locking device has a latch, a first elastic device, a push arm, and a sliding switch. The latch locks a fixing indention of the removable device to fix the removable device. The first elastic device provides a force to push the latch moving forward and a space for the latch moving back. When the removable device is taken out, the sliding switch pushes the push arm first. Then, a slider of the push arm pushes a sliding inclined surface of the latch to withdraw the latch from the fixing indention. Subsequently, the push arm pushes the removable device outward for releasing the removable device. The movements of the sliding switch and the latch form an included angle, preferably about 90 degrees.

20 Claims, 3 Drawing Sheets

INTEGRATED LOCKING DEVICE

FIELD OF THE INVENTION

The present invention relates to an integrated locking device, and more particularly, to an integrated locking device for locking a peripheral device in a notebook computer.

BACKGROUND OF THE INVENTION

Information technology and the computer industry are highly developed now. Portable electronic devices, such as a notebook computer, are widely used. Due to weight and practical requirements, portable devices tend to be lighter, thinner and smaller. The notebook computer is a successful product because the notebook computer with powerful calculation capability deals with a great amount of digital data.

A computer apparatus operates with a central processing unit (CPU) on a motherboard. Besides a central processing unit (CPU) for calculating operations, there are other peripheral devices, such as, for example, a floppy disk (FD) drive, a hard disk drive (HDD), a compact disc read-only memory (CD-ROM) drive, a rewritable CD (CD-RW) drive, a digital video disk (DVD) drive, or a card reader.

Currently, the notebook computer product is popular in the market because the key component of the notebook computer is cheaper now and therefore the price thereof is acceptable to the user. The functionality and performance of the notebook computer are approaching near those of the desktop computer. Furthermore, requirements for office mobility and the electronic-enterprise trend are caused by the popular use of the Internet in the world. Thus, the occupation rate of the notebook computer on market increases even larger than that of the desktop computer.

Different notebook computer users need different peripheral devices for their business activities. However, a common problem of the notebook computer is that the interior space is too small to install all peripheral devices therein. Hence, a removable device module for a notebook computer has been developed and external peripheral devices are therefore moved inside the notebook computer with the removable device module. The removable device module accordingly effectively enhances the performance and functionality of the notebook computer.

A conventional notebook computer with the removable device module utilizes a locking device to lock the removable device inside the notebook computer for safe operations. For withdrawing or exchanging the removable device, some of the conventional notebook computers further are configured with a withdrawal mechanism to remove the removable device from the notebook computer. When the user needs to withdraw the removable device, the user pushes a release switch with one hand for withdrawing a latch of the locking device from a fixing indentation of the removable device, and pushes the withdrawal mechanism with the other hand to remove the removable device from the notebook computer. Accordingly, the locking device and the withdrawal mechanism occupy a quite large area and space in the notebook computer and the removable device has to be released from the notebook computer with both hands of the user. The removal operation of the removable device is not convenient.

Furthermore, a conventional locking device withdraws the latch from the fixing indentation of the removable device perpendicular to a withdrawal direction of the removable device. Therefore, in the perpendicular direction, the locking device and the latch have to work a quite long distance for locking and releasing the removable device safely. However, the interior space of a notebook computer is increasingly tight, and the locking device with a long protruding distance from the removable device easily interferes with other devices.

SUMMARY OF THE INVENTION

One object of the present invention is to provide an integrated locking device for reducing the occupation space thereof and fixing effectively a removable device in a removable device module.

Another object of the present invention is to provide an integrated locking device having a locking device and a withdrawal mechanism linked with the locking device to push the removable device outward so that the removable device can be removed with only one hand.

A further object of the present invention is to provide an integrated locking device with a sliding switch where the sliding switch moves perpendicular to a movement of a latch of the integrated locking device and parallel to the withdrawal direction of the removable device to reduce a required length protruding from the removable device in the perpendicular direction of the withdrawal direction and provide an effective and safe fixing manner for the removable device.

The present invention provides an integrated locking device suitable to fix or remove a removable device, and especially for use in a notebook computer. The integrated locking device has a latch with a sliding inclined surface, a first elastic device, a push arm, and a sliding switch.

The latch is inserted into a fixing indentation of the removable device and therefore fixes the removable device in a fixing container. The first elastic device couples to the latch and pushes the latch forward for fixing the removable device. The latch moves backward to compress the first elastic device when the latch is pressed by a shell of the removable device so as to avoid interfering with the movement of the removable device.

The sliding switch couples to the push arm with a slider glidingly coupling to the sliding inclined surface. The sliding switch pushes the push arm, so that the slider of the push arm presses on the sliding inclined surface to withdraw the latch from the fixing indentation of the removable device, and then the push arm further pushes the removable device outward when the sliding switch is pushed to release the removable device. The movements of the latch and the sliding switch form a predetermined included angle, preferably about 90 degrees.

The integrated locking device further has a sliding holder and the sliding holder further has a first sliding guider and a second sliding guider. The latch glidingly couples to the first sliding guider, and the sliding switch with a clamp glidingly couples to the second sliding guider and clamps the push arm. The integrated locking device further has a second elastic device coupling to the push arm and the sliding holder to pull the push arm back to an original position.

Another aspect of the present invention provides a removable device module with an integrated locking device. The removable device module with the foregoing integrated locking device configured beside the fixing container of the removable device module fixes safely the removable device therein and removes easily the removable device therefrom.

A further aspect of the present invention provides a notebook computer having a removable device module with an integrated locking device. The notebook computer utilizes the foregoing integrated locking device to fix safely a peripheral device, e.g. a floppy disk drive, a hard disk, a card reader, or an optical disk drive, therein, and remove conveniently the peripheral device from the notebook computer with only one hand of the user. Due to the movements of the latch and the sliding switch forming an included angle, preferably about 90 degrees, the protrusion length of the integrated locking device from the fixing container can be effectively reduced.

The integrated locking device can effectively lock an electrical apparatus in the fixing container and provide a quick exchange capability for the electrical apparatus. The integrated locking device according to the present invention can also effectively reduce the protrusion length on the removable device module so as to reduce the occupation space thereof. Hence, the locking device can provides a quick fixing and removal mechanism for a removable device in the notebook computer. Further, the locking device can effectively reduce the occupation space in the notebook computer and avoid interfering with other devices. Furthermore, the user can use only one hand to withdraw the removable device from the notebook computer with the integrated locking device according to the present invention.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
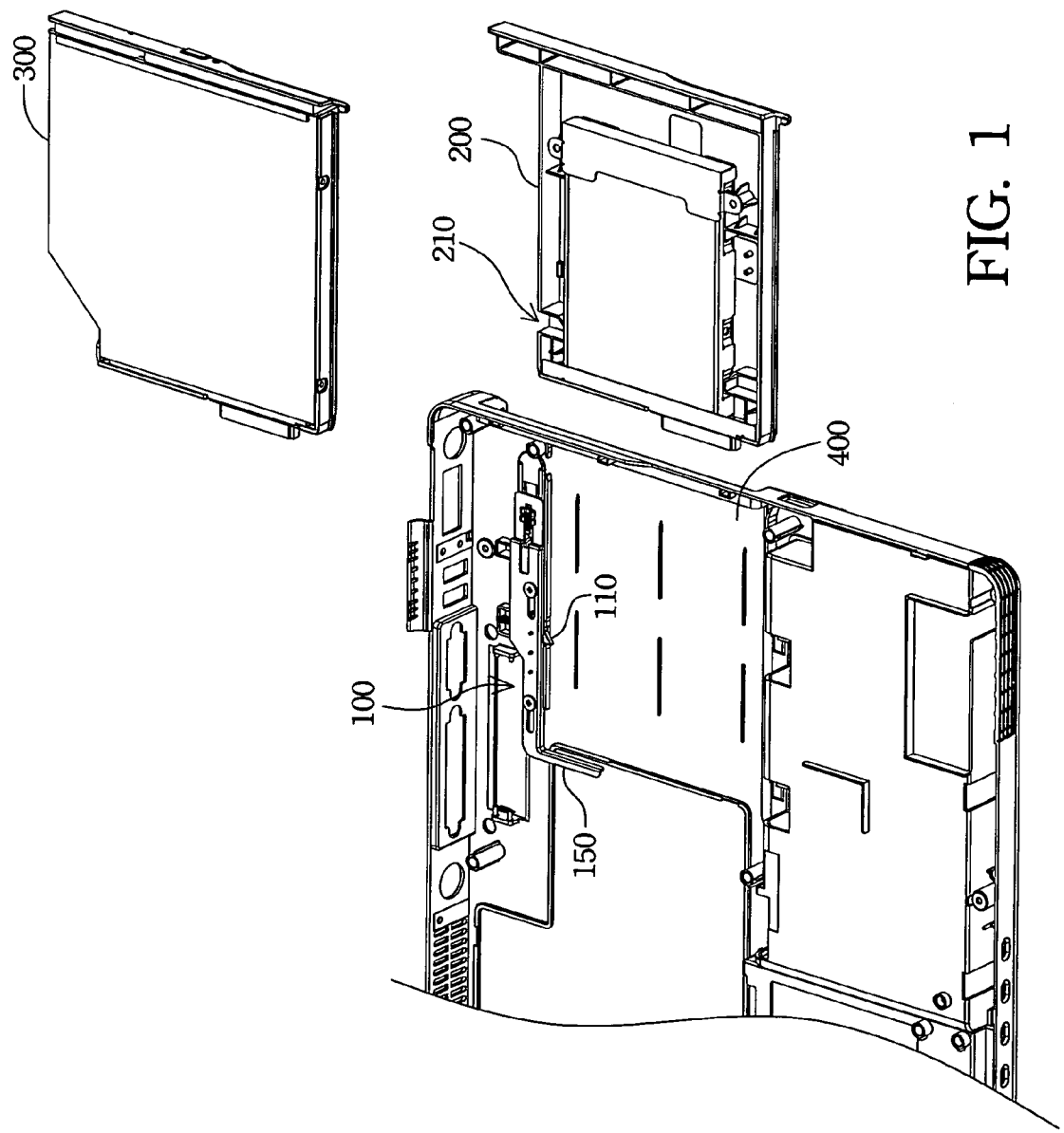
FIG. 1 is a schematic view of a preferred embodiment of an integrated locking device according to the present invention.

FIG. 1 is a schematic view of a preferred embodiment of an integrated locking device according to the present invention. An integrated locking device 100 is configured in a notebook computer, and the integrated locking device 100 utilizes a latch 110 to fix a first removable device 200 or a second removable device 300 in a fixing container 400. The first removable device 200 is a peripheral device and the second removable device 300 is another peripheral device for the notebook computer. The peripheral device includes, for example, a removable hard disk, a removable floppy disk drive, a spare battery module, or an optical disk drive of the notebook computer. The optical disk drive is a CD-ROM, a DVD-ROM, a CD-RW, or the like. The integrated locking device 100 can effectively fix various peripheral devices of the notebook computer in the fixing container 400.

When the first removable device 200 is inserted into the fixing container 400 and a fixing indentation 210 of the first removable device 200 arrives at a front position of the latch 110 of the integrated locking device 100, the latch 110 rebounds and inserts into the fixing indentation 210 to fix stably the first removable device 200 in the fixing container 400. When the first removable device 200 is withdrawn from the fixing container 400, the latch 110 is pushed out of the fixing indentation 219 to unlock the first removable device 200, and a push arm 150 simultaneously pushes the first removable device 200 out of the fixing container 400.

After the first removable device 200 is released from the fixing container 400, the second removable device 300 can then be installed into the fixing container 400. Therefore, a notebook computer user can exchange the peripheral device very easily according to the working requirement at that time. The integrated locking device consequently provides a good extension capability for a notebook computer.

Figure 2:
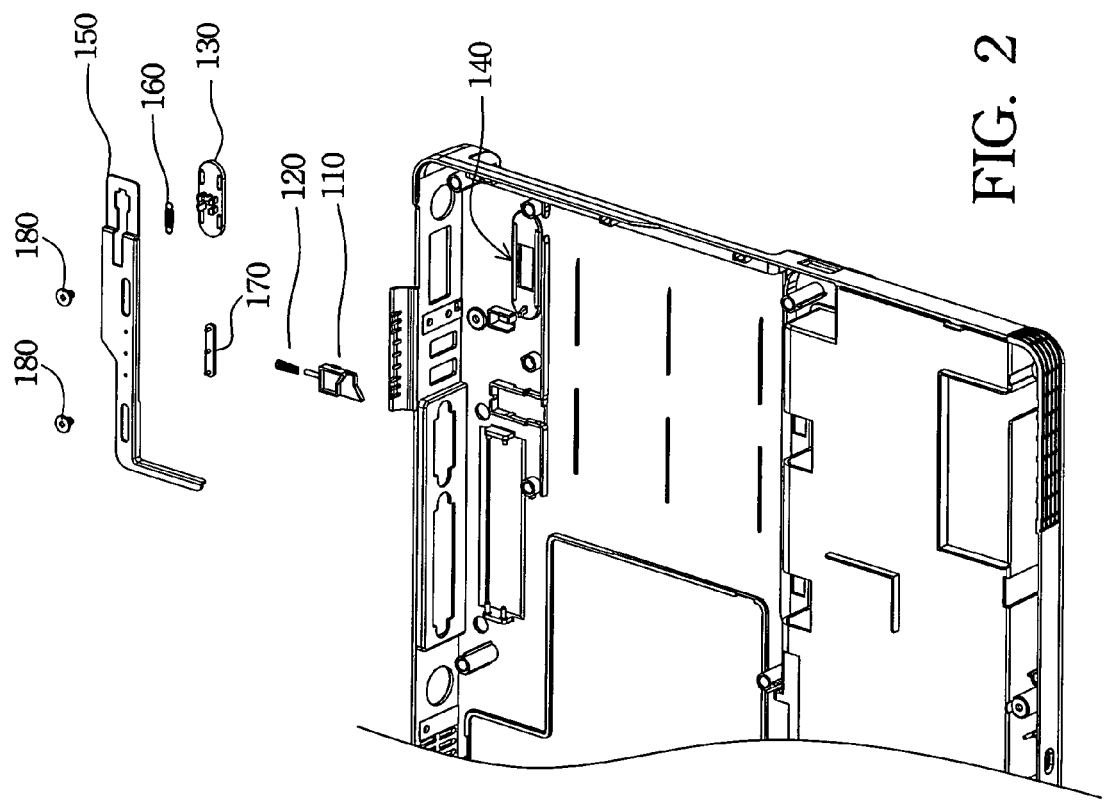
FIG. 2 is an exploded view of the preferred embodiment of FIG. 1.

FIG. 2 is an exploded view of the preferred embodiment of FIG. 1. The integrated locking device according to the present invention includes a first elastic device 120, the latch 110, a sliding switch 130, the push arm 150, a second elastic device 160, a slider 170, and a sliding holder 140. The first elastic device 120 provides a spring force to push the latch 110 forward in a predetermined direction and hence the latch 110 can effectively lock the removable device. The sliding switch 130 provides a withdrawal force through the push arm 150 and the slider 170 to the latch 110, and the latch 110 can be therefore withdrawn from the fixing indentation 210 of the removable device so that the removable device can be withdrawn from the fixing container.

Figure 3:
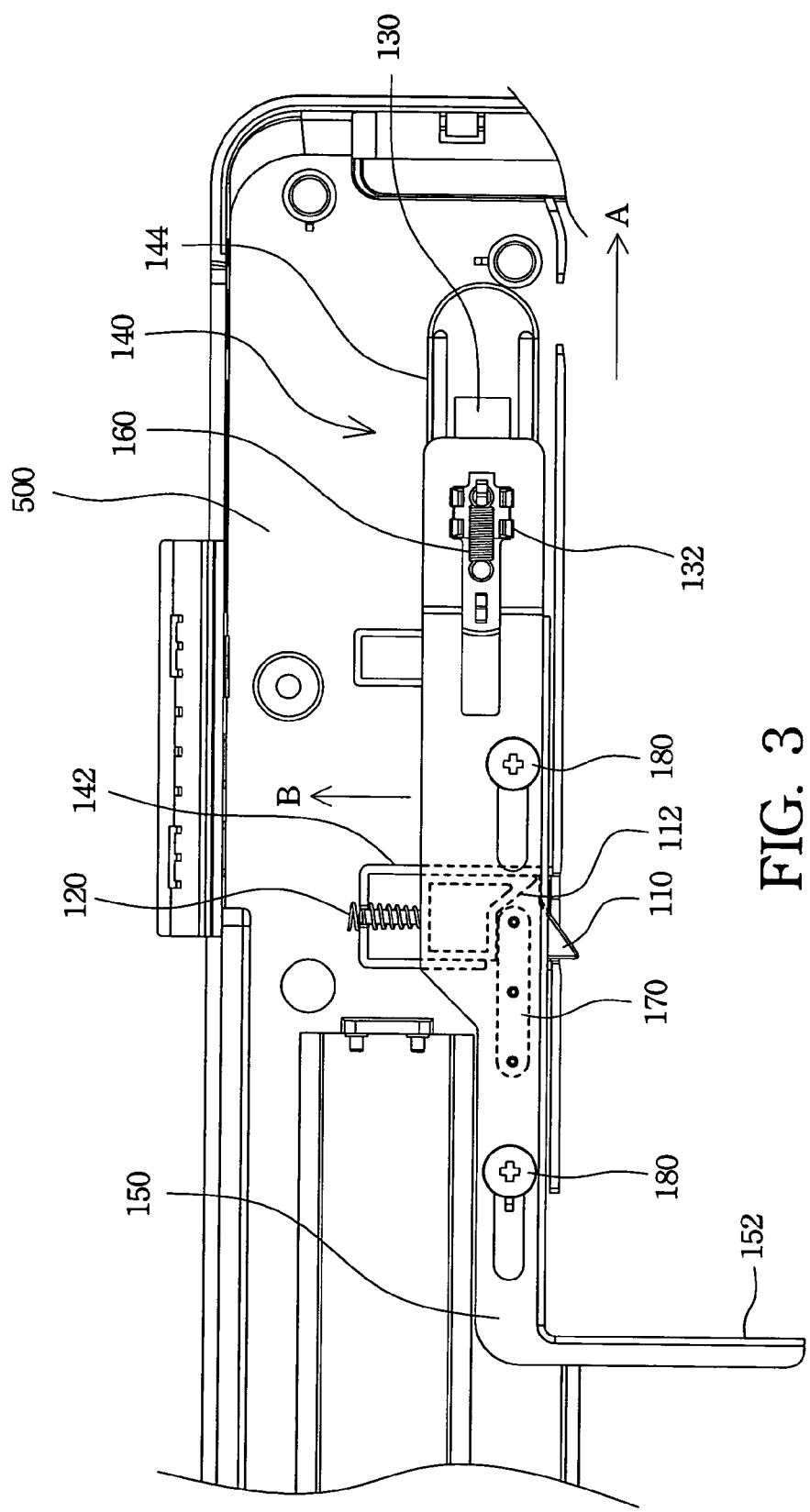
FIG. 3 is a detailed view of the integrated locking device according to the present invention.

FIG. 3 is a detailed view of the integrated locking device according to the present invention to describe the detailed operation mechanism thereof. The latch 110 has a sliding inclined surface 112 to couple glidingly to the slider 170 on the push arm 150. The sliding switch 130 is configured below a base 500 of the notebook computer. Clamps 132 of the sliding switch 130 clasp the push arm 150, upward and through a second sliding guider 144 of the sliding holder 140. Therefore, the sliding switch 130 can slide in the second sliding guider 144 of the sliding holder 140 on the base 500.

The sliding holder 140 further has a first sliding guider 142. A predetermined included angle is formed between the second sliding guider 144 on the base 500 and the first sliding guider 142. A preferably predetermined included angle is about 90 degrees. The latch 110 is coupled to the first sliding guider 142, and therefore the latch 110 can slide in the first sliding guider 142. Accordingly, the movements of the latch 110 and the sliding switch 130 are therefore preferably perpendicular to each other. The first elastic device 120 is coupled to one end of the latch 110 to provide a spring force to push the latch 110 forward in the predetermined direction, and the latch 110 can therefore effectively insert into the fixing indentation of the removable device to fix the removable device in the fixing container 400. The first elastic device 120 further provides a space for the latch 110 moving back to avoid interfering with the removable device on installation or removal.

When a removable device 200 is installed on a notebook computer, the first step is to push the removable device 200 into the fixing container and the latch 110 automatically moves back in the predetermined direction due to a push force caused by the latch 110 touching the case shell of the removable device. Until the fixing indentation 210 arrives at the front position of the latch 110, the spring force generated by the first elastic device 120 pushes the latch 110 forward to insert into the fixing indentation 210 in the predetermined direction and the removable device 200 is effectively fixed by the latch 110.

When the removable device 200 is withdrawn from the notebook computer, the sliding switch 130 is moved to right side of the drawing along the direction A, and the clamp 132 of the sliding switch 130 forces the slider 170 fixed on the push arm 150 toward the sliding inclined surface 112 of the latch 110. Until the slider 170 is touching the sliding inclined surface 112 and continuously moved in the direction A to right side of the drawing, the latch 110 is moved back in the predetermined direction B. Therefore, the latch 110 is withdrawn from the fixing indentation 210 of the removable device 200. Simultaneously, a push extension 152 of the push arm 150 pushes the removable device 200 outward, and hence the removable device can be conveniently removed from the fixing container. The movement of the push arm 150 is parallel with that of the sliding switch 130, and therefore an included angle, preferably about 90 degrees, is formed between the push arm 150 and the latch 110 when movement.

The integrated locking device according to the present invention further utilizes a second elastic device 160 to couple to the sliding holder 140 on the base 500 and the push arm 150. When the removable device 200 is removed from the fixing container, the second elastic device 160 pulls the push arm 150 and the sliding switch 130 to move back to an original position for standing by next operation. The push arm 150 further utilizes the sliding fixing device 180 to couple to and slide on the base 500.

The integrated locking device according to the present invention utilizes the sliding inclined surface 112 of the latch 110 to move the latch 110, and therefore the predetermined included angle is formed between the sliding switch 130 and the latch 110. Accordingly, the protrusion length of the integrated locking device from the fixing container can be effectively reduced and the required occupation space can also be reduced. Comparing with a conventional locking device, the movements of the push arm and the sliding switch of the integrated locking device according to the present invention are parallel with the withdrawal direction of the removable device and the protruding length thereof is accordingly reduced. Therefore, the configuration of devices in the notebook computer is convenient and the integrated locking device utilizes a small occupation space in the notebook computer and for avoiding interfering with other devices.

Furthermore, the integrated locking device according to the present invention utilizes the push extension 152 of the push arm 150 to push the removable device outward from the fixing container after the latch 110 is removed from the fixing indentation 210. Hence, a user using only one hand can very easily withdraw the removable device from the notebook computer with the integrated locking device according to the present invention. Consequently, the notebook computer with the integrated locking device possesses better portability and operability.

The integrated locking device according to the present invention can effectively reduce the occupation space thereof and therefore be convenient for configuration of devices in the notebook computer. Furthermore, the integrated locking device according to the present invention is suitable to fix and remove the removable device not only in the notebook computer but also in any apparatus having a removable device.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An integrated locking device, comprising:
    a latch comprising a sliding inclined surface and moving forward and backward in a predetermined direction;
    a first elastic device coupling to the latch, the elastic device pushing the latch forward for inserting into a fixing indentation of a removable device, and the latch moving backward to compress the first elastic device when the latch is pressed by a shell of the removable device;
    a push arm coupling to the latch, wherein the push arm further comprises a slider and the slider glidingly couples to the sliding inclined surface of the latch; and
    a sliding switch coupling to the push arm, a predetermined included angle formed between the latch and the sliding switch when movement, wherein the sliding switch pushes the push arm, the slider of the push arm presses on the sliding inclined surface to withdraw the latch from the fixing indentation of the removable device, and the push arm further pushes the removable device outward when the sliding switch is pushed to release the removable device.

2. The integrated locking device of claim 1, wherein the integrated locking device comprises a sliding holder and the sliding holder further comprises a first sliding guider and a second sliding guider.

3. The integrated locking device of claim 2, wherein the latch glidingly couples to the first sliding guider.

4. The integrated locking device of claim 2, wherein the sliding switch glidingly couples to the second sliding guider.

5. The integrated locking device of claim 2, wherein the sliding switch further comprises a clamp to clamp the push arm.

6. The integrated locking device of claim 2, wherein the integrated locking device further comprises a second elastic device coupling to the push arm and the sliding holder to pull the push arm back to an original position.

7. The integrated locking device of claim 1, wherein the predetermined included angle is about 90 degrees.

8. A removable device module with an integrated locking device comprising:
    a fixing container;
    a removable device comprising a shell and a fixing indentation, wherein the removable device is capable of inserting into and being removed from the fixing container; and
    an integrated locking device configured beside the fixing container, the integrated locking device locking the removable device when the removable device is inserted into the fixing container, wherein the integrated locking device further comprises:
        a latch having a sliding inclined surface and moving forward and backward in a predetermined direction;
        a first elastic device coupling to the latch, the latch moving backward to compress the first elastic device when the removable device is inserted into the fixing container and the latch is pressed by the shell of the removable device, until the fixing indentation of the removable device arrives at a front position of the latch, the first elastic device pushing the latch forward for inserting into the fixing indentation to fix the removable device;

a push arm coupling to the latch, wherein the push arm further comprises a slider and the slider glidingly couples to the sliding inclined surface of the latch; and a sliding switch coupling to the push arm, a predetermined included angle formed between the latch and the sliding switch when movement, wherein the sliding switch pushes the push arm, the slider of the push arm presses on the sliding inclined surface to withdraw the latch from the fixing indentation of the removable device, and the push arm further pushes the removable device outward when the sliding switch is pushed to release the removable device.

9. The removable device module of claim 8, wherein the integrated locking device comprises a sliding holder and the sliding holder further comprises a first sliding guider and a second sliding guider.

10. The removable device module of claim 9, wherein the latch couples to the first sliding guider.

11. The removable device module of claim 9, wherein the sliding switch couples to the second sliding guider.

12. The removable device module of claim 11, wherein the sliding switch further comprises a clamp to clamp the push arm and glidingly couple the second sliding guider.

13. The removable device module of claim 9, wherein the integrated locking device further comprises a second elastic device coupling to the push arm and the sliding holder to pull the push arm back to an original position.

14. The removable device module of claim 8, wherein the predetermined included angle is about 90 degrees.

15. A notebook computer having a removable device module with an integrated locking device, comprising:

a removable device module fixing container installed in the notebook computer;

a removable device comprising a shell and a fixing indentation, wherein the removable device is capable of being inserted into and removed from the removable device module fixing container; and an integrated locking device configured beside the removable device module fixing container, the integrated locking device locking the removable device when the removable device is inserted into the removable device module fixing container, wherein the integrated locking device further comprises:

a latch having a sliding inclined surface and moving forward and backward in a predetermined direction;

an elastic device coupling to the latch, wherein when the removable inserts into the removable device module fixing container, the latch is pressed by the shell of the removable device so that the latch moves backward to compress the first elastic device, until the fixing indentation arriving in front of the latch, the first elastic device pushing the latch forward to insert into the fixing indentation of the removable device for fixing the removable device in the removable device module fixing container;

a push arm coupling to the latch, wherein the push arm further comprises a slider and the slider glidingly couples to the sliding inclined surface of the latch; and a sliding switch coupling to the push arm, a predetermined included angle formed between the latch and the sliding switch when movement, wherein the sliding switch pushes the push arm, the slider of the push arm presses on the sliding inclined surface to withdraw the latch from the fixing indentation of the removable device, and the push arm further pushes the removable device outward when the sliding switch is pushed to release the removable device.

16. The notebook computer of claim 15, wherein the notebook computer further comprises a sliding holder and the sliding holder comprises a first sliding guider and a second sliding guider, wherein the latch glidingly couples to the first sliding guider and the sliding switch glidingly couples to the second sliding guider.

17. The notebook computer of claim 16, wherein the sliding switch further comprises a clamp to clamp the push arm.

18. The notebook computer of claim 16, wherein the integrated locking device further comprises a second elastic device coupling to the push arm and the sliding holder to pull the push arm back to an original position.

19. The notebook computer of claim 15, wherein the removable device comprises a peripheral device of the notebook computer.

20. The notebook computer of claim 19, wherein the peripheral device of the notebook computer is a floppy disk drive, a hard disk, an optical disk drive, or a spare battery module.

* * * * *